(12) United States Patent
Jun

(10) Patent No.: US 12,489,884 B2
(45) Date of Patent: Dec. 2, 2025

(54) METHOD AND APPARATUS FOR EVALUATING PERFORMANCE OF DRIVE VIDEO RECORD SYSTEM

(71) Applicants: Hyundai Motor Company, Seoul (KR); Kia Corporation, Seoul (KR)

(72) Inventor: Sung Hwan Jun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 233 days.

(21) Appl. No.: 17/967,480

(22) Filed: Oct. 17, 2022

(65) Prior Publication Data

US 2023/0403390 A1 Dec. 14, 2023

(30) Foreign Application Priority Data

Jun. 13, 2022 (KR) .......................... 10-2022-0071364

(51) Int. Cl.
*H04N 17/06* (2006.01)
*G06F 3/16* (2006.01)
*H04N 5/77* (2006.01)
*H04N 5/91* (2006.01)

(52) U.S. Cl.
CPC ............. *H04N 17/06* (2013.01); *G06F 3/165* (2013.01); *H04N 5/77* (2013.01); *H04N 5/91* (2013.01)

(58) Field of Classification Search
CPC H04N 17/06; H04N 5/77; H04N 5/91; H04N 9/73; H04N 21/4307; H04N 17/04; G06F 3/165; G06F 18/2413; G11B 27/10; G07C 5/0866

USPC ......................................................... 348/181
See application file for complete search history.

(56) References Cited

U.S. PATENT DOCUMENTS

| 4,963,967 | A | * | 10/1990 | Orland | ..................... | H04N 7/04 348/484 |
| 5,243,424 | A | * | 9/1993 | Emmett | .................... | H04N 7/04 348/484 |
| 6,414,960 | B1 | * | 7/2002 | Kuhn | ...................... | H04N 7/088 348/181 |
| 6,505,964 | B1 | * | 1/2003 | Ando | ................... | G11B 27/036 |
| 7,692,724 | B2 | * | 4/2010 | Arora | ..................... | G11B 27/10 348/473 |
| 9,963,096 | B2 | * | 5/2018 | Drescher | ................ | H04N 23/20 |
| 2002/0177996 | A1 | * | 11/2002 | Cooper | .................... | H04N 5/76 |
| 2003/0152145 | A1 | * | 8/2003 | Kawakita | ............... | H04N 7/088 348/E7.086 |

(Continued)

*Primary Examiner* — Michael Lee
(74) *Attorney, Agent, or Firm* — Banner & Witcoff, Ltd.

(57) ABSTRACT

A method for evaluating performance of a driving video recording system may include extracting, by a control device, a plurality of video frames from a video file, identifying, by the control device, a time interval associated with at least one video frame that comprises a marker among the plurality of video frames and identifying a first time point, of the time interval, corresponding to the at least one video frame, identifying, by the control device and from the video file, a sound signal corresponding to the at least one video frame to identify a second time point, of the time interval, associated with the sound signal corresponding to the at least one video frame, and outputting, by the control device and based on a time difference between the first time point and the second time point, a result associated with a time synchronization performance of the driving video recording system.

15 Claims, 8 Drawing Sheets

(56) References Cited

U.S. PATENT DOCUMENTS

| | | | |
|---|---|---|---|
| 2005/0012860 A1* | 1/2005 | Cooper | H04N 5/067 |
| | | | 348/E5.014 |
| 2014/0201126 A1* | 7/2014 | Zadeh | A61B 5/165 |
| | | | 706/52 |
| 2016/0292881 A1* | 10/2016 | Bose | G11B 27/10 |
| 2018/0091847 A1* | 3/2018 | Wu | H04N 21/2383 |
| 2018/0144746 A1* | 5/2018 | Mishra | G06V 40/172 |

* cited by examiner

METHOD AND APPARATUS FOR EVALUATING PERFORMANCE OF DRIVE VIDEO RECORD SYSTEM

This application claims the benefit of Korean Patent Application No. 10-2022-0071364, filed on Jun. 13, 2022, which is hereby incorporated by reference as if fully set forth herein.

BACKGROUND

Some driving video recording systems (which may also be referred to as drive video record systems) (DVRSs) of vehicles are equipped with sound recording capabilities. However, so far, performance of the sound recording function of those DVRSs has not been properly evaluated in many cases.

For example, after a developer completes an encoding process for synthesizing audio data and video data in a DVRS, performance evaluation (also referred to as end-to-end latency verification) for a sound recording function of a DVRS has not been properly performed in many cases.

In addition, in an aftermarket, some black box manufacturing companies, and/or other original equipment manufacturing (OEM) companies have not properly performed performance evaluation on the sound recording function of DVRSs in many cases. Accordingly, even in the case of DVRSs manufactured by the same manufacturer, performance of a sound recording function of each model of DVRSs has not been consistent in some cases.

Further, even when performance of the sound recording function of the DVRS is evaluated, qualitative performance evaluation has been conducted according to subjective criteria of an evaluator, and there has been a problem of inconsistency and unreliability in the performance evaluation of the sound recording function (e.g., due to the absence of a quantitative criterion for the evaluation).

If an evaluator determines whether sound and video of a DVRS are synchronized with each other according to the evaluator's subjective criteria, the evaluation results for synchronization between sound and video of the DVRS may not be consistent and may not be objectively assessed.

For example, when a developer (or evaluator) evaluates the sound recording function of a DVRS, the developer may reproduce video output together with sound to record video and sound through the DVRS, and may determine whether video and sound are time-synchronized with each other by looking at the video footages and hearing the sound. The evaluation may not be consistent because the evaluator(s)'s perception and/or the evaluation criteria may vary.

Further, there has been a problem in that sound recording performance is not uniformly ensured, for example, due to the absence of a criterion for determining the volume of the sound recording function of the DVRS.

SUMMARY

One or more examples of the present disclosure are directed to a method and apparatus for evaluating performance of a DVRS that substantially obviate one or more problems due to limitations and disadvantages associated with some devices and/or implementations.

One or more examples of the present disclosure provide a method and apparatus for evaluating performance of a DVRS capable of ensuring uniform sound recording performance by quantifying an evaluation criterion for evaluating sound recording performance of the DVRS.

One or more examples of the present disclosure provide a method and apparatus for evaluating performance of a DVRS capable of ensuring uniform sound recording performance of DVRSs of different manufacturers and/or different models.

Additional advantages, objects, and features of the features described herein may be set forth in part in the description which follows and in part will become apparent to those having ordinary skill in the art upon examination of the following or may be learned from practice of the embodiment(s). One or more example objectives and other advantages of the present disclosure may be realized and attained by the structure particularly pointed out in the written description and claims hereof as well as the appended drawings.

A method may comprise: extracting, by a control device, a plurality of video frames from a video file generated by a driving video recording system; identifying, by the control device and among the plurality of video frames, a time interval associated with at least one video frame that comprises a marker and identifying a first time point, of the time interval, corresponding to the at least one video frame; identifying, by the control device and from the video file, a sound signal corresponding to the at least one video frame to identify a second time point, of the time interval, associated with the sound signal corresponding to the at least one video frame; and outputting, by the control device and based on a time difference between the first time point and the second time point, a result associated with a time synchronization performance of the driving video recording system.

The marker may comprise a pre-designated color characteristic that comprises at least one of: a characteristic in which a color temperature satisfies a pre-designated color temperature value; or a characteristic in which a contrast ratio satisfies a pre-designated contrast ratio value. The identifying the sound signal corresponding to the at least one video frame may be based on a pre-designated sound characteristic. The pre-designated sound characteristic may comprise a characteristic in which amplitude of the sound signal corresponds to a maximum value.

The video file may be generated by the driving video recording system while a simulation device outputs test video frames corresponding to a video portion of the video file and a test sound signal corresponding to a sound portion of the video file. At least one first test video frame among the test video frames may comprises a pre-designated reference color characteristic. The test sound signal may comprise a first test sound signal comprising the pre-designated sound characteristic, and is time-synchronized with the test video frames.

The method may further comprise generating the result by at least one of: determining, based on the time difference exceeding a pre-designated reference range, that the time synchronization performance is not satisfied; or determining, based on the time difference being in the pre-designated reference range, that the time synchronization performance is satisfied.

A method may comprise: extracting, by a control device, a sound signal from a video file generated by a driving video recording system; evaluating, by the control device and based on a digital sound pressure level of the extracted sound signal, volume of sound recorded by the driving video recording system; and generating, based on the evaluating, a performance result associated with the driving video recording system.

The video file may be generated by the driving video recording system while a simulation device outputs a test sound signal at one or more volume levels pre-designated in one or more pre-designated frequency bands. The evaluating may comprise evaluating whether volume of the driving video recording system is satisfied for one or more frequency bands.

The evaluating may comprise: determining, based on the digital sound pressure level of the extracted sound signal satisfying a reference value, that the volume for one or more frequency bands is satisfied; or determining, based on the digital sound pressure level of the extracted sound signal not satisfying the reference value, that the volume for the one or more frequency bands is not satisfied.

An apparatus may comprise: a memory configured to store a video file generated by a driving video recording system; and a processor coupled to the memory, wherein the processor is configured to: extract a plurality of video frames from the video file; identify, among the plurality of video frames, a time interval associated with at least one video frame that comprises a marker, and identify a first time point, of the time interval, corresponding to the at least one video frame; identify, from the video file, a sound signal corresponding to the at least one video frame to identify a second time point, of the time interval, associated with the sound signal corresponding to the at least one video frame; and output, based on a time difference between the first time point and the second time point, a result associated with a time synchronization performance of the driving video recording system.

The marker may comprise a pre-designated color characteristic that comprises at least one of: a characteristic in which a color temperature satisfies a pre-designated color temperature value; or a characteristic in which a contrast ratio satisfies a pre-designated contrast ratio value. The processor may be configured to identify the sound signal corresponding to the at least one video frame based on a pre-designated sound characteristic. The pre-designated sound characteristic may comprise a characteristic in which amplitude of the sound signal corresponds to a maximum value.

The video file may be generated by the driving video recording system while a simulation device outputs test video frames corresponding to a video portion of the video file and a test sound signal corresponding to a sound portion of the video file. At least one first test video frame among the test video frames may comprise a pre-designated reference color characteristic. The test sound signal may comprise a first test sound signal comprising the pre-designated sound characteristic, and is time-synchronized with the test video frames.

The processor may be configured to: determine, based on the time difference exceeding a pre-designated reference range, that the time synchronization performance is not satisfied; and determine, based on the time difference being in the pre-designated reference range, that the time synchronization performance is satisfied.

The apparatus may comprise a communication interface configured to receive, from the driving video recording system, the video file. The apparatus may comprise a simulation device configured to output test video frames corresponding to a video portion of the video file and a test sound signal corresponding to a sound portion of the video file; and the driving video recording system configured to generate, based on test video frames and the test sound signal, the video file. At least one first test video frame of the test video frames comprises the marker.

It is to be understood that both the foregoing general description and the following detailed description of the present disclosure are exemplary and explanatory.

BRIEF DESCRIPTION OF THE DRAWINGS

The accompanying drawings, which are included to provide a further understanding of the invention and are incorporated in and constitute a part of this application, illustrate embodiment(s) of the present disclosure and together with the description serve to explain the principle of one or more inventive concepts. In the drawings.

DETAILED DESCRIPTION

Figure 1:
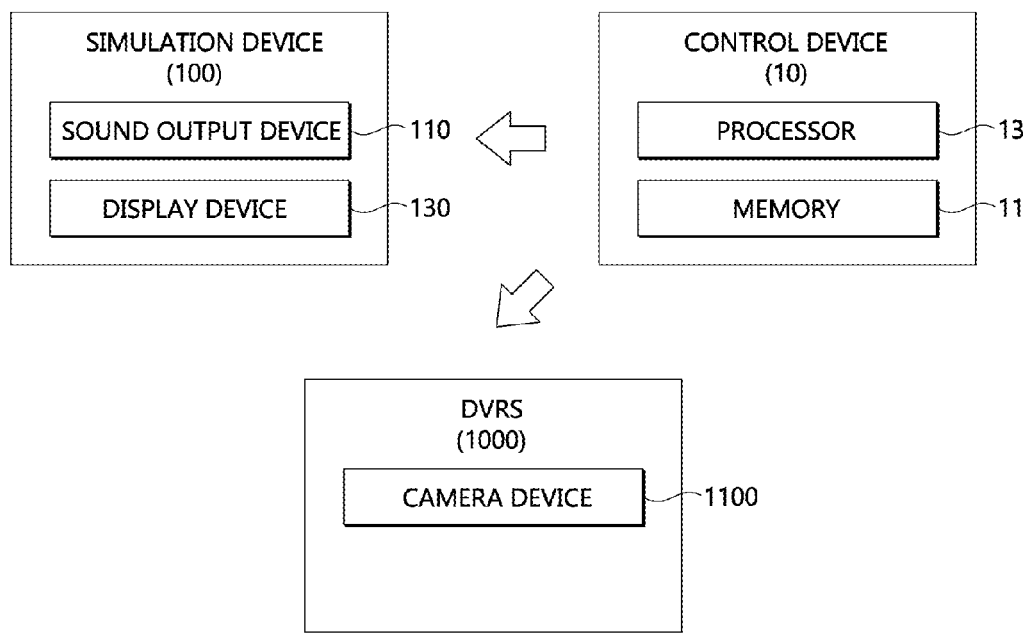
FIG. 1 is a block diagram of a system for evaluating performance of a driving video recording system (DVRS)

Like reference numerals may refer to like elements throughout the specification. This specification does not describe all elements of example embodiment(s), and general content in the technical field to which the present disclosure pertains or content overlapping among the embodiment(s) may be omitted. The term "unit, module, or device" used in this specification may be implemented as software and/or hardware. A plurality of "units, modules, or devices" may be implemented as one element, or one "unit, module, or device" may include a plurality of elements.

Throughout the specification, when a part is referred to as being "connected" to another part, the part may be directly connected or indirectly connected to the other part. Further, indirect connection may include connection through a wireless communication network.

When a part is referred to as "including" an element, another element may be further included, rather than excluding another element, unless otherwise stated.

Terms such as "first", "second", etc. are used to distinguish one element from another element, and the elements are not limited by the above-mentioned terms.

A singular expression includes the plural form unless the context clearly dictates otherwise.

In each step, a reference numeral may be used for convenience of description, and the reference numeral does not describe the order of each step. Each step may be performed differently from the specified order unless context clearly indicates a specific order.

Audio and video recorded by a DVRS of a vehicle may be used as important evidence in the event of a vehicle accident.

Accordingly, techniques for improving accuracy of time synchronization of audio and video recorded by the DVRS and controlling sound for video recorded by the DVRS to be normally output are becoming important, and evaluation techniques for these techniques are also becoming important.

In this regard, the present disclosure provides a technique for evaluating performance of the DVRS.

For example, the present disclosure provides a performance evaluation technique for improving accuracy of time synchronization of audio and video recorded and reproduced by the DVRS.

The present disclosure also provides a performance evaluation technique as to whether normal volume sound is generated and reproduced according to volume of sound recorded and reproduced by the DVRS and a frequency band of a sound signal. For example, the present disclosure provides a performance evaluation technique as to whether normal volume sound is generated and reproduced for video recorded and reproduced by the DVRS.

Hereinafter, a working principle and various examples of the present disclosure will be described with reference to the accompanying drawings.

FIG. 1 is a block diagram of a system for evaluating performance of a DVRS.

Figure 2:
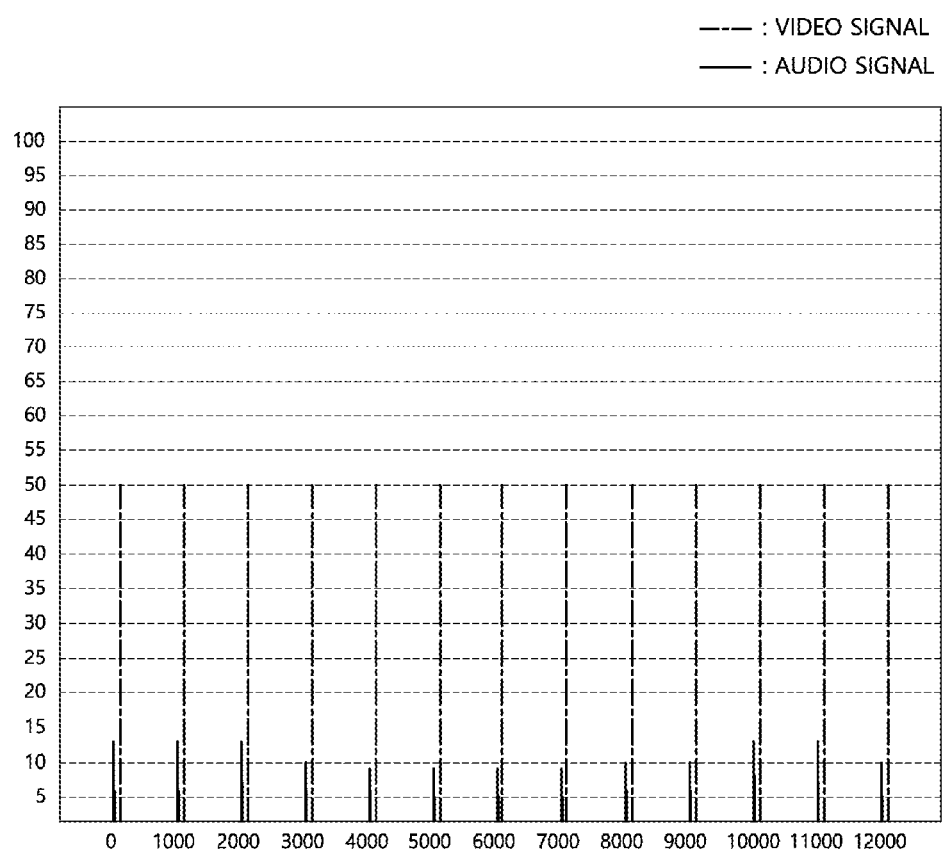
FIG. 2 is a diagram illustrating output waveforms of a video signal and a sound signal time-synchronized with each other.

FIG. 2 is a diagram illustrating output waveforms of a video signal and a sound signal time-synchronized with each other.

Figure 3A:
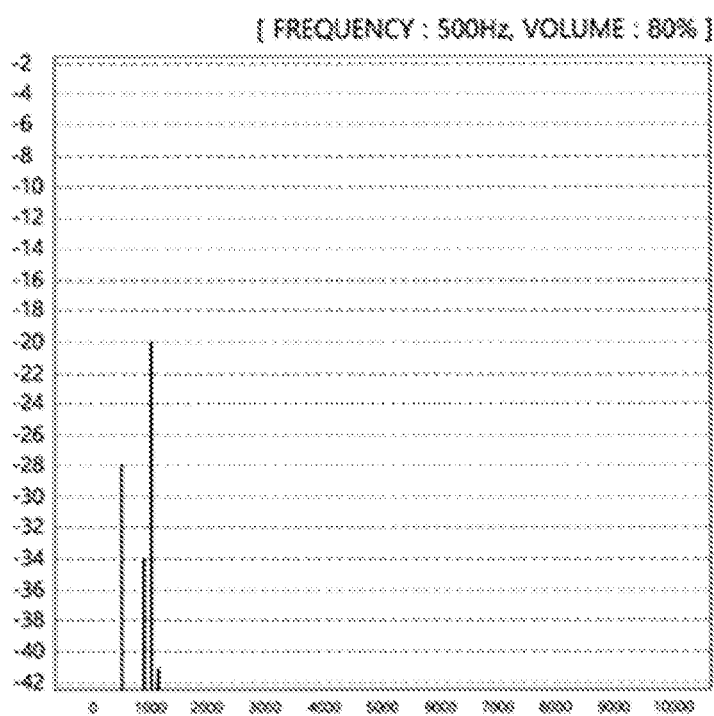
FIG. 3A and FIG. 3B are diagrams illustrating output waveforms of a sound signal for each frequency band.
Figure 3B:
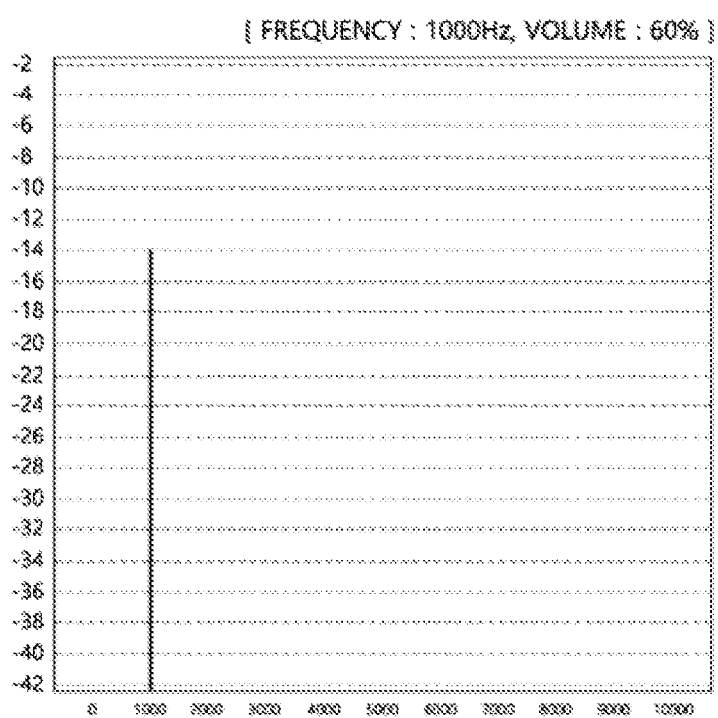

FIG. 3A and FIG. 3B are diagrams illustrating output waveforms of a sound signal for each frequency band.

Referring to FIG. 1, a performance evaluation system 1 may include a control device 10, a simulation device 100, and a DVRS 1000. The control device 10, the simulation device 100, and the DVRS 1000 may be electrically connected to each other and/or communicatively connected to each other through a communication circuit and/or other communication interfaces.

The control device 10 may include a memory 11 and a processor 13.

The memory 11 may store various data used in the control device 10, for example, input data and/or output data for a software program and commands and/or instructions related thereto. The memory 11 may store data received from an external device, data acquired by the processor 13, and/or data output by the processor 13.

The memory 11 may store a software program for executing performance evaluation of the DVRS 1000.

The memory 11 may store data used for performance evaluation of the DVRS 1000.

For example, the data used for performance evaluation may include video frames for testing and a sound signal for testing that may be time-synchronized with each other.

The video frames for testing may include at least one test video frame (also referred to as at least one first test video frame) (e.g., previously) generated to include a (e.g., predetermined) color characteristic. The sound signal for testing may include a sound signal for testing (also referred to as a first sound signal for testing) (e.g., previously) generated to include a (e.g., predetermined) sound characteristic.

The video frames for testing and the sound signal for testing may be time-synchronized with each other so that the at least one first test video frame and the first sound signal for testing are time-synchronized with each other. Accordingly, output start times of the at least one first test video frame and the first sound signal for testing may be the same.

The predetermined color characteristic may include a characteristic in which a color temperature is equal to or greater than a predetermined color temperature value and/or a characteristic in which a contrast ratio is equal to or greater than a predetermined contrast ratio value. The predetermined sound characteristic may include a characteristic in which the amplitude of the sound signal corresponds to a maximum value (e.g., a peak value).

The data used for performance evaluation may be generated, for example, based on a sound signal recorded when a marker satisfies a condition (e.g., a ball bounces off a floor) and video frames generated so that a circle blinks in red. The data used for performance evaluation may be generated, for example, by setting an output time point of the sound signal when the ball bounces off the floor and an output time point of the video frames in which the circle is red so that the output time points are time-synchronized with each other. If the test data is output (e.g., as illustrated in FIG. 2), a video signal and a sound signal time-synchronized with each other may be obtained.

For example, the data used for performance evaluation may store a sound signal for testing at each of a plurality of volume levels in each of a plurality of frequency bands.

For example, the plurality of frequency bands may include 500 Hz and 1000 Hz. The plurality of volume levels may include a volume level of 40% of the maximum volume, a volume level of 60% of the maximum volume, and a volume level of 80% of the maximum volume.

For example, when a sound signal having a frequency of 500 Hz and volume set to 80% of the maximum volume may be output, a result illustrated in FIG. 3A may be output, and when a sound signal having a frequency of 1000 Hz and volume set to 60% of the maximum volume is output, a result illustrated in FIG. 3B may be output.

The sound signal for testing at each of the plurality of volume levels in each of the plurality of frequency bands may be set to a signal value (e.g., a precise signal value), for example, based on one or more experiments and/or calibrations on an output of a speaker using a tool such as a sound pressure meter. For example, the sound signal for testing at each of the plurality of volume levels in each of the plurality of frequency bands may be acquired by adjusting volume for each frequency band using a standard speaker and outputting a sound signal.

The processor 13 may perform various data processing (for example, signal processing, etc.) and operations.

The processor 13 may evaluate performance of the DVRS 1000, for example, sound recording performance.

For example, the processor 13 may evaluate time synchronization performance of video and sound recorded by the DVRS 1000 based on analysis of a recorded file provided (e.g., transmitted) from the DVRS 1000. The processor 13 may evaluate suitability of volume of sound recorded by the DVRS 1000, for example, suitability of volume of recorded sound for recorded video, for example, based on analysis of a recorded file provided from the DVRS 1000.

One or more examples of an operation for evaluating the performance of the DVRS 1000 of the processor 13 will be described later.

The processor 13 may control a simulation device 100 and the DVRS 1000.

For example, the processor 13 may provide data used for performance evaluation of the DVRS 1000 to the simulation device 100 and perform a control operation so that the simulation device 100 reproduces corresponding video and sound.

For example, the processor 13 may set a frequency and output volume for a sound signal for testing output from the simulation device 100.

The processor 13 may control the DVRS 1000 so that, while the simulation device 100 reproduces video, the DVRS 1000 records video and sound reproduced by the simulation device 100.

The simulation device 100 may output data for evaluating the performance of the DVRS, for example, a sound signal for testing and video frames for testing.

The simulation device 100 may include a sound output device 110 and a display device 130.

The sound output device 110 (e.g., a speaker) may output a sound signal for testing (which may be referred to as a sound signal).

The display device 130 (which may be referred to as a display) may output video frames for testing (which may be referred to as video frames).

For example, the sound output device 110 may receive a sound signal for testing from the control device 10, and the display device 130 may receive video frames for testing from the control device 10.

For example, output of the sound signal for testing by the sound output device 110 and output of the video frames for testing by the display device 130 may be performed based on control of the control device 10.

The DVRS 1000 may include a camera device 1100.

The camera device 1100 may include one or more cameras.

The camera device 1100 may have a recording function capable of acquiring video and recording sound (e.g., the camera device 1100 may record video and sound to generate a video file).

For example, the camera device 1100 may record video and sound output by the simulation device 100 to generate a video file, and may provide the video file to the control device 10.

For example, while the sound output device 110 outputs a sound signal for testing and the display device 130 outputs video frames for testing, the camera device 1100 may record sound output by the sound output device 110 and video output by the display device 130 (e.g., based on control of the control device 10) to generate a video file (for example, an mp4 file, or any other video file format). The camera device 1100 may copy the video file and provide the copied video file to the control device 10.

The DVRS 1000 may be a built-in cam, a built-in drive video recording device, a dash cam, a built-in black box, or the like.

The DVRS 1000 may include a memory (not illustrated) to store the generated video file in the memory.

Figure 4:
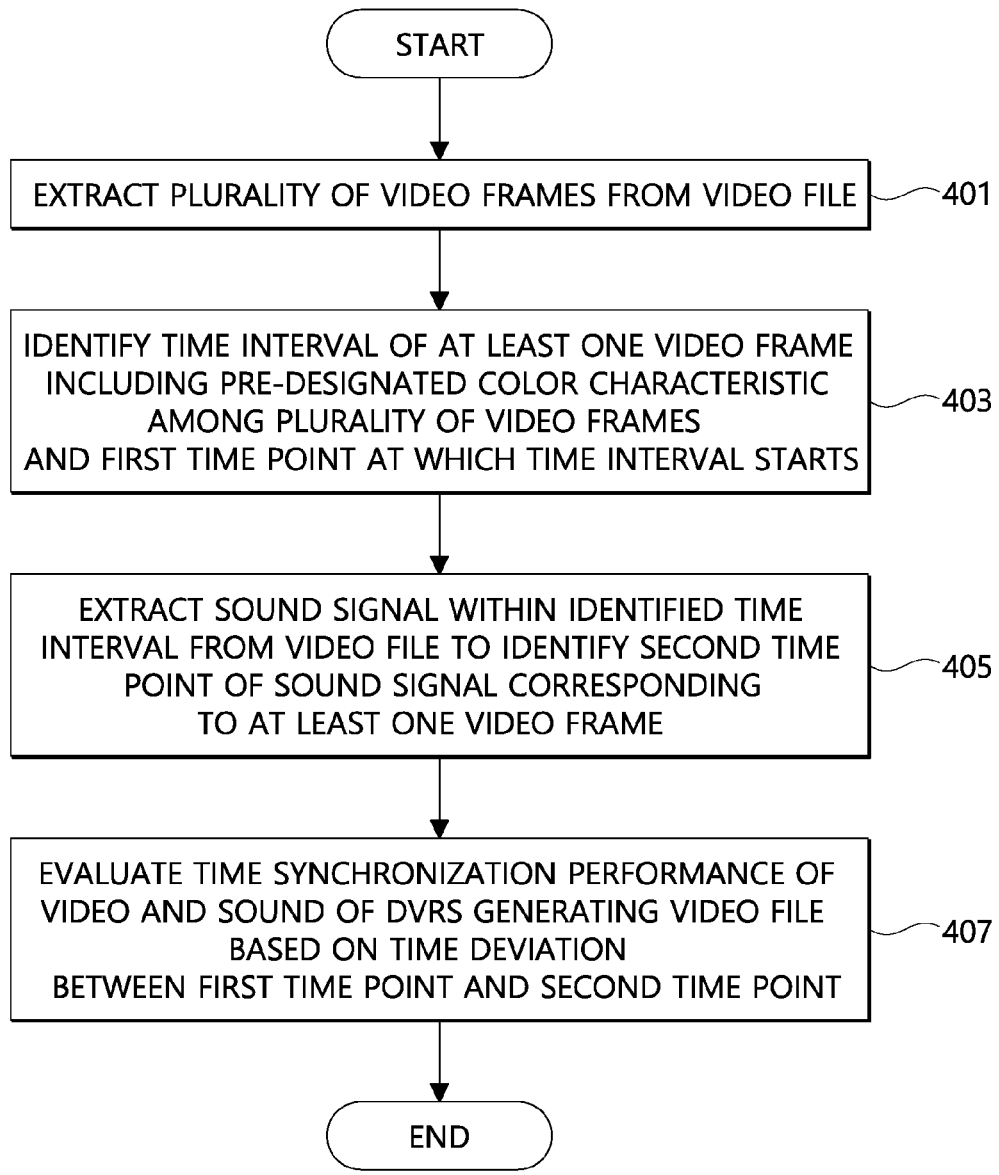
FIG. 4 is a flowchart of a performance evaluation operation of a DVRS of a control device.

FIG. 4 is a flowchart of a performance evaluation operation of a DVRS. One or more steps illustrated in FIG. 4 may be performed by the control device 10 (and/or the processor 13) or other devices.

The control device 10 may extract a plurality of video frames from a video file (401).

For example, the video file may be generated by the DVRS 1000 recording video and sound while the simulation device 10 outputs video frames for testing and a sound signal for testing.

At least one first video frame for testing among the video frames for testing may include a pre-designated reference color characteristic. For example, the at least one first video frame for testing may include a video frame in which a red circle is displayed.

The sound signal for testing may include a first sound signal for testing including a pre-designated sound characteristic. The sound signal for testing may be time-synchronized with video frames for testing so that the at least one first video frame for testing and the first sound signal for testing are time-synchronized with each other. For example, the first sound signal for testing is time-synchronized so that designated sound is output when a red circle is displayed (e.g., in the first video frame), and may be a signal in which amplitude of a signal waveform has a maximum value.

The control device 10 may identify a time interval of at least one video frame including a pre-designated color characteristic among a plurality of video frames and a first time point at which the time interval starts (403).

For example, the control device 10 may identify at least one video frame in which a color temperature is equal to, or greater than, a pre-designated color temperature and/or a contrast ratio is equal to, or greater than, a pre-designated contrast ratio among a plurality of video frames, and identify a time interval of the at least one video frame.

For example, when the at least one video frame is a video frame in which a red circle is displayed, a first time point may be a time point at which the red circle is displayed.

The control device 10 may extract a sound signal within the identified time interval from the video file to identify a second time point of the sound signal corresponding to the at least one video frame (405).

For example, the control device 10 may identify a sound signal having a maximum amplitude value in the sound signal within the identified time interval, thereby identifying the second time point of the sound signal.

For example, when the at least one first video frame for testing is a video frame in which a red circle is displayed, the above-described identified time interval may be a time interval from an arbitrary time point before video of the red circle is displayed to another arbitrary time point after the video of the red circle is displayed.

For example, when the first sound signal for testing is time-synchronized so that sound is output when the red circle is displayed, a sound signal having a maximum amplitude value in the sound signal within the identified time interval may include a signal having amplitude corresponding to the first sound signal for testing. If there is no error in time-synchronization of the DVRS 1000, the sound signal having the maximum amplitude value in the sound signal within the identified time interval may be a sound signal of sound to be output when the red circle is displayed.

The control device 10 may evaluate time synchronization performance of video and sound of the DVRS 1000 generating a video file based on a time deviation between the first time point and the second time point (407).

For example, when the time difference between the first time point and the second time point exceeds a pre-designated reference range, the control device 10 may determine that the time synchronization performance of the video and sound of the DVRS 1000 is unsatisfactory. If the time difference between the first time point and the second time point is included in the pre-designated reference range, the control device 10 may determine that the time synchronization performance of the video and sound of the DVRS 1000 is satisfactory.

For example, when the at least one first video frame for testing is a video frame in which a red circle is displayed, and the first sound signal for testing is time-synchronized so that sound is output when the red circle is displayed, the control device 10 may evaluate accuracy of time synchronization of the video and sound of the DVRS based on a time difference between the first time point at which the red circle is displayed and the second time point at which the sound is output.

Figure 5:
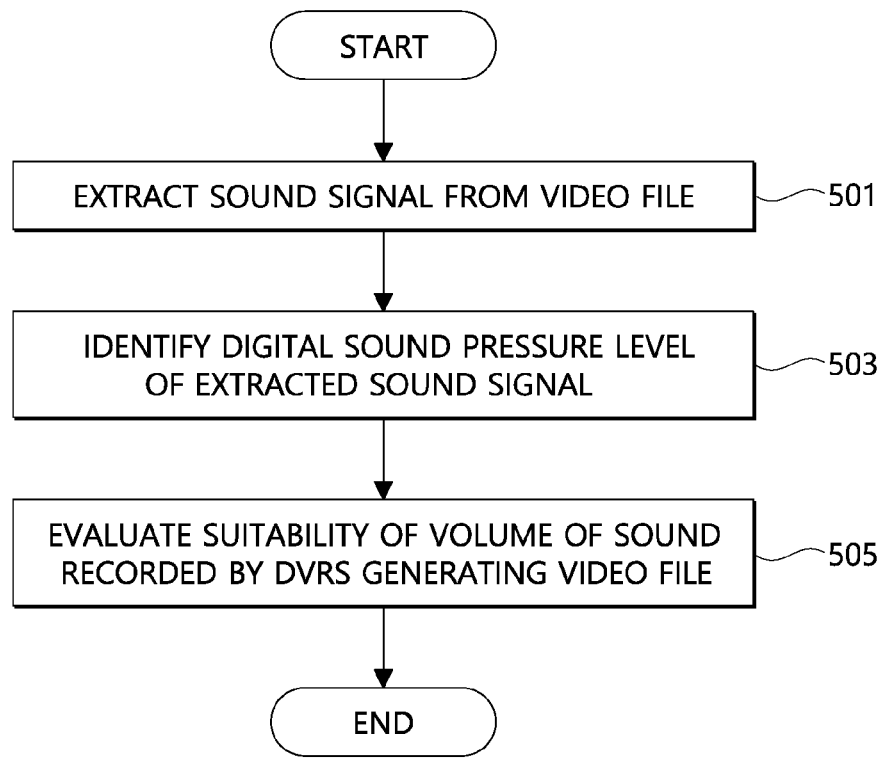
FIG. 5 is a flowchart of a performance evaluation operation of the DVRS of the control device.

FIG. 5 is a flowchart of a performance evaluation operation of the DVRS of the control device 10 (and/or the processor 13).

The control device 10 may extract a sound signal from a video file (501).

For example, the video file may be generated by the DVRS 1000 recording sound while the simulation device 100 outputs a sound signal for testing at each pre-designated volume level in each of the pre-designated frequency bands.

The control device 10 may identify a digital sound pressure level of the extracted sound signal (503).

The control device 10 may identify the digital sound pressure level using one or more techniques including a known technique. For example, a decibel full scale (dBFS) value of the extracted sound signal may be identified.

The control device 10 may evaluate suitability of volume of sound recorded by the DVRS 1000 generating the video file (505).

For example, the control device 10 may evaluate suitability of volume in each frequency band of the sound recorded by the DVRS 1000 generating the video file.

For example, when a digital sound pressure level of an extracted sound signal is equal to, or greater than, a reference value, the control device 10 may determine that volume of each frequency band of the DVRS 1000 is satisfactory. If the digital sound pressure level of the extracted sound signal is less than the reference value, the control device 10 may determine that the volume of each frequency band of the DVRS 1000 is not satisfactory.

Figure 6:
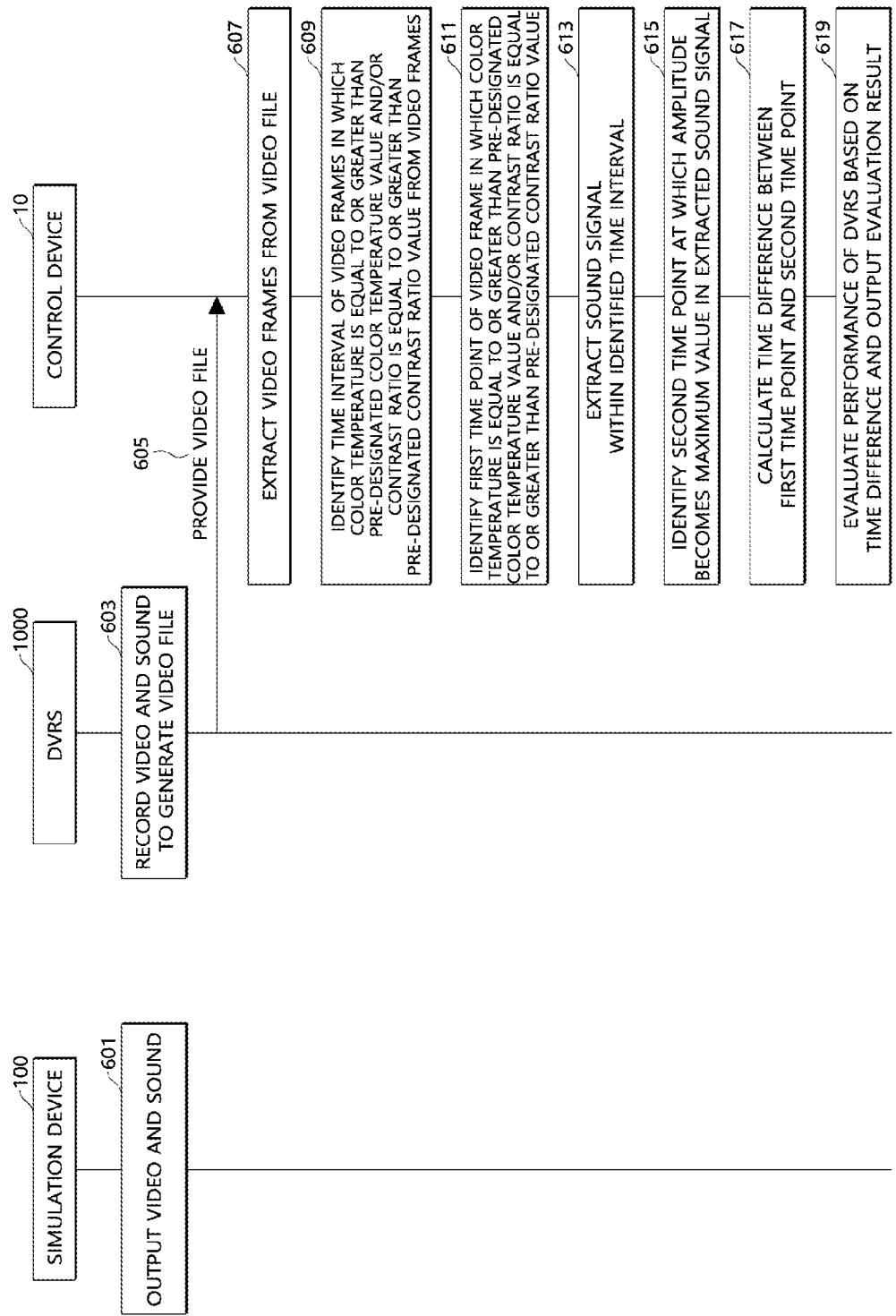
FIG. 6 is a flowchart of an operation of a performance evaluation system of the DVRS.

FIG. 6 is a flowchart of an operation of the performance evaluation system 1 of the DVRS 1000.

The simulation device 100 may output video and sound (which may be referred to as video for testing and sound for testing, respectively) (601).

For example, the simulation device 100 may output video and sound based on control of the control device 10.

For example, sound may be output through the sound output device 110 and video may be output through the display device 130. The sound and the video may be synchronized with each other, and sound output of the sound output device 110 and video output of the display device 130 may be simultaneously performed.

The DVRS 1000 may record video and sound to generate a video file (603).

For example, the DVRS 1000 may record video and sound based on control of the control device 10.

The DVRS 1000 may capture an image of a screen of the display device 130 and execute a recording function during sound output of the sound output device 110 and video output of the display device 130, and generate a video file by recording video displayed on the screen of the display device 130 and sound output through the sound output device 110.

For example, the video file may include an mp4 file or any other video format.

The DVRS 1000 may provide (e.g., deliver, send, transmit) the video file to the control device 10 (605).

The DVRS 1000 may automatically copy the generated video file and provide the copied video file to the control device 10.

The control device 10 may extract video frames from the video file (607).

The control device 10 may identify a time interval of video frames in which a color temperature is equal to or greater than a pre-designated color temperature value and/or a contrast ratio is equal to or greater than a pre-designated contrast ratio value from the video frames (609).

The control device 10 may identify a first time point of a video frame in which a color temperature is equal to, or greater than, the pre-designated color temperature value and/or a contrast ratio is equal to, or greater than, the pre-designated contrast ratio value (611).

The control device 10 may extract a sound signal within the identified time interval (613).

The control device 10 may identify a second time point at which the amplitude becomes a maximum value in the extracted sound signal (615).

The control device 10 may calculate a time difference between the first time point and the second time point (617).

The control device 10 may evaluate the performance of the DVRS 1000 based on the calculated time difference and output an evaluation result (619).

For example, the control device 10 may generate a chart-type file by recording the time difference between the first time point and the second time point, and transmit the file to any connected device.

The above-described operations shown in FIG. 6 may be automatically and repeatedly performed for each of pre-designated recording modes (for example, a regular recording mode and/or a recording mode activated when a collision occurs) of the DVRS 1000.

according to the above-described example, video output by the simulation device 100 may include at least one video frame in which a marker (e.g., a red ball) is generated. If sound output by the simulation device 100 is sound recorded when the marker satisfies a condition (e.g., the ball bounces off the floor), time synchronization may be performed so that display of the marker (e.g., the red ball) and output of the sound recorded when the marker satisfies a condition (e.g., the ball bounces off the floor) are simultaneously performed.

In this instance, the pre-designated color temperature value may correspond to a temperature value of the color (e.g., red color) of the marker (e.g., the ball), and the pre-designated contrast value may correspond to a contrast ratio value of the color (e.g., the red color) of the marker (e.g., the ball). The maximum value of the amplitude of the sound signal may correspond to the sound signal of the sound recorded when the marker satisfies the condition (e.g., the ball bounces off the floor).

Under this assumption, the time interval of the video frames in which the color temperature is equal to, or greater than, the pre-designated color temperature value and/or the contrast ratio is equal to, or greater than, the pre-designated contrast ratio value may be used to analyze a sound signal within a time interval from a time point before a time point when the marker (e.g., the red ball) is displayed to a time point after the time point when the marker (e.g., the red ball) is displayed in the entire sound signal without analyzing the entire sound signal.

The above-described first time point may be a time point at which the video recording system 1000 acquires video of the marker (e.g., the red ball) displayed by the simulation device 100. The above-described second time point may be a time point at which the video recording system 1000 acquires sound output by the simulation device 100 when the marker satisfies the condition (e.g., the ball bounces off the floor). Such a time difference between the first time point and the second time point may be referred to as a time synchronization difference between video and sound of the DVRS 1000.

If the time difference between the first time point and the second time point exceeds a predetermined reference range, the control device 100 may determine that time synchronization performance of the video and sound of the DVRS 1000 is unsatisfactory. If the time difference between the first time point and the second time point is included in the predetermined reference range, the control device 100 may determine that time synchronization performance of the video and sound of the DVRS 1000 is satisfactory.

Figure 7:
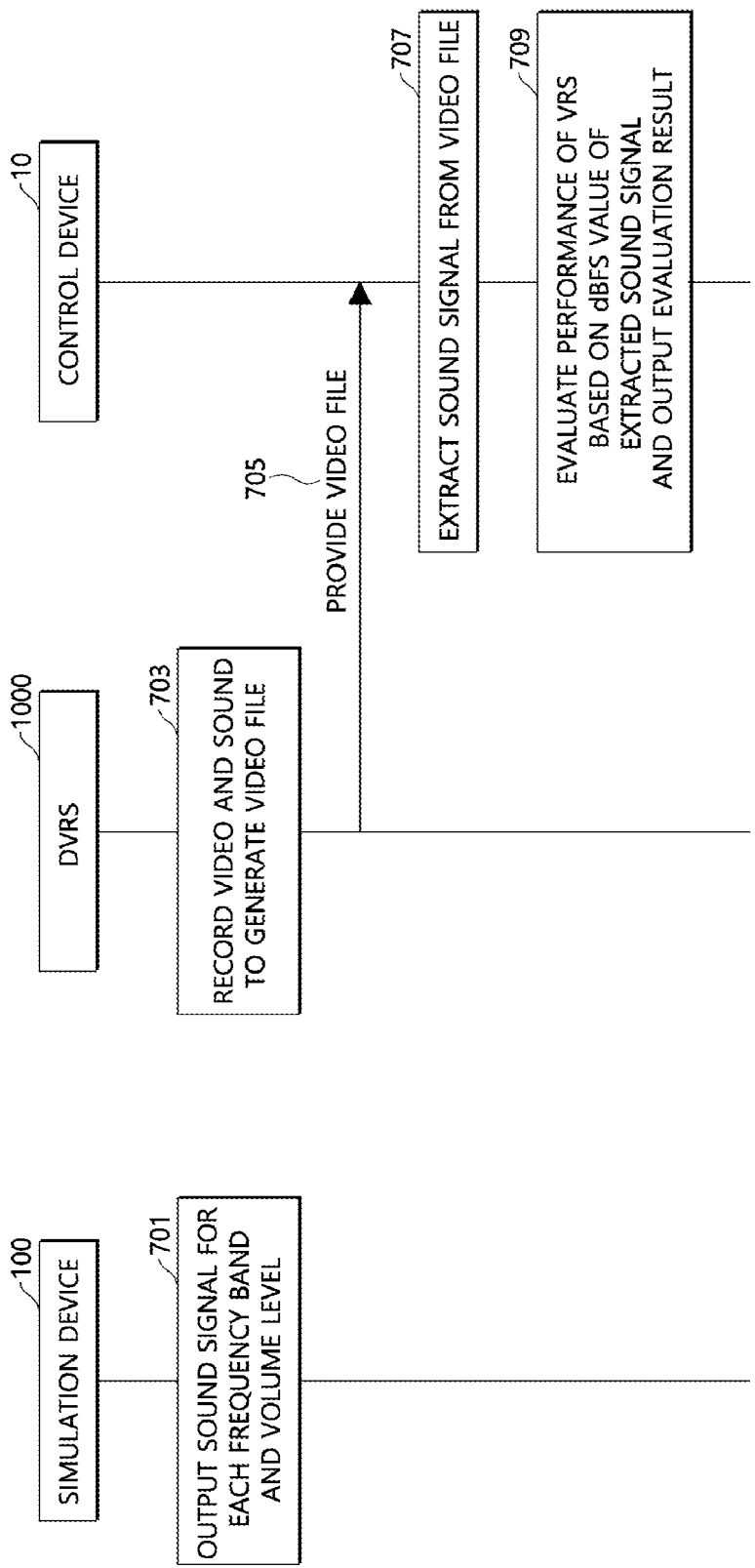
FIG. 7 is a flowchart of an operation of the performance evaluation system of the DVRS.

FIG. 7 is a flowchart of an operation of the performance evaluation system 1 of the DVRS.

The simulation device 100 may output a sound signal for each frequency band and volume level (701).

The DVRS 1000 may record video and sound to generate a video file (703).

The DVRS 1000 may provide the video file to the control device 10 (705).

The control device 10 may extract a sound signal from the video file (707).

The control device 10 may evaluate performance of the DVRS 1000 based on a dBFS value of the extracted sound signal and output an evaluation result (709).

According to the above-described examples, the control device 10 may separate a sound signal from video data in the video file generated by the DVRS 1000, extract the sound signal, and calculate a dBFS value from the sound signal.

A reference value for the dBFS value for each sound signal may be pre-designated through a preliminary experiment. If the dBFS value of the calculated sound signal is equal to, or greater than, the reference value, the control device 10 may determine that the volume for each frequency band of the corresponding signal is satisfactory. Otherwise, the control device 10 may determine that the volume for each frequency band of the corresponding signal is unsatisfactory.

For such a result, the control device 10 may generate a file in the form of a chart (or any other form), and may transmit the file to any connected device.

In the above-described example described with respect to FIG. 7, it has been described that the performance evaluation of the volume for each frequency band of the sound of the DVRS 1000 is performed based on the dBFS value. In another example, the volume at the time of sound reproduction, not the dBFS value, may be measured through a sound pressure device, and the performance evaluation of the volume for each frequency band of the sound of the DVRS 1000 may be performed by comparing the measured value with a reference value.

One or more of the above-described operations described with respect to FIG. 7 may be automatically and repeatedly performed for each of the pre-designated recording modes (for example, a regular recording mode and/or a recording mode activated when an impact occurs) of the DVRS 1000.

One or more examples described herein provides automatic evaluation of sound recording performance of the DVRS 1000 for the vehicle. The evaluation may include a synchronization evaluation of audio and video recorded and reproduced by the DVRS 1000 and volume evaluation of video reproduced for each frequency band.

In the DVRS 1000, if a vehicle accident occurs, the accident scenes and sounds before and after the accident may be important. Thus, whether video and audio are synchronized with each other, which may be evaluated according to one or more examples of the present disclosure, may be utilized as an important recording performance index. From a commercial point of view, a volume level of a moving image generated according to one or more examples of the present disclosure may be utilized as a major performance index.

The method for evaluating performance of the DVRS according to one or more examples of the present disclosure may ensure uniform audio recording performance of the DVRS regardless of a model or version of the DVRS.

The method for evaluating performance of the DVRS according to one or more examples of the present disclosure may provide an effect of improving marketability and may provide a customer with more accurate audio recording data compared to other DVRSs in the case of occurrence of an accident of a vehicle.

To achieve one or more objectives and advantages, a method for evaluating performance of a DVRS may include extracting, by a control device, a plurality of video frames from a video file, identifying, by the control device, a time interval of at least one video frame including a pre-designated color characteristic among the plurality of video frames and a first time point at which the time interval starts, extracting, by the control device, a sound signal within the time interval from the video file to identify a second time point of the sound signal corresponding to the at least one video frame, and evaluating, by the control device, time synchronization performance of video and sound of the DVRS generating the video file based on a time deviation between the first time point and the second time point.

The pre-designated color characteristic may include at least one of a characteristic in which a color temperature is equal to or greater than a pre-designated color temperature value or a characteristic in which a contract ratio is equal to or greater than a pre-designated contrast ratio value.

The sound signal corresponding to the at least one video frame may be identified based on a pre-designated sound characteristic.

The pre-designated sound characteristic may include a characteristic in which amplitude of the sound signal becomes a maximum value.

The video file may be generated by the DVRS recording the video and the sound while a simulation device outputs video frames for testing corresponding to the video and a sound signal for testing corresponding to the sound, at least one first video frame for testing among the video frames for testing may include a pre-designated reference color characteristic, and the sound signal for testing may include a first sound signal for testing including a pre-designated sound characteristic, and may be time-synchronized with the video frames for testing so that the at least one first video frame for testing and the first sound signal for testing are time-synchronized with each other.

The evaluating may include determining that the time synchronization performance is unsuitable when the time deviation exceeds a pre-designated reference range, and determining that the time synchronization performance is suitable when the time deviation is included in the pre-designated reference range.

a method for evaluating performance of a DVRS may include extracting, by a control device, a sound signal from a video file, and evaluating, by the control device, suitability of volume of sound recorded by the DVRS generating the video file based on a digital sound pressure level of the extracted sound signal.

The video file may be generated by the DVRS recording sound while a simulation device outputs a sound signal for testing at each volume level pre-designated in each of pre-designated frequency bands.

Suitability of volume of the DVRS may include suitability of volume for each frequency band.

The evaluating may include determining that the volume for each frequency band is suitable when a digital sound pressure level of the extracted sound signal is equal to or greater than a reference value, and determining that the volume for each frequency band is unsuitable when the digital sound pressure level of the extracted sound signal is less than the reference value.

An apparatus for evaluating performance of a DVRS may include a memory configured to store a video file, and a processor electrically connected to the memory, in which the processor extracts a plurality of video frames from the video file, identifies a time interval of at least one video frame including a pre-designated color characteristic among the plurality of video frames and a first time point at which the time interval starts, extracts a sound signal within the time interval from the video file to identify a second time point of the sound signal corresponding to the at least one video frame, and evaluates time synchronization performance of video and sound of the DVRS generating the video file based on a time deviation between the first time point and the second time point.

The pre-designated color characteristic may include at least one of a characteristic in which a color temperature is equal to or greater than a pre-designated color temperature value or a characteristic in which a contract ratio is equal to or greater than a pre-designated contrast ratio value.

The sound signal corresponding to the at least one video frame may be identified based on a pre-designated sound characteristic.

The pre-designated sound characteristic may include a characteristic in which amplitude of the sound signal becomes a maximum value.

The video file may be transmitted after being generated by the DVRS recording the video and the sound while a simulation device outputs video frames for testing corresponding to the video and a sound signal for testing corresponding to the sound, at least one first video frame for testing among the video frames for testing may include a pre-designated reference color characteristic, and the sound signal for testing may include a first sound signal for testing including a pre-designated sound characteristic, and may be time-synchronized with the video frames for testing so that the at least one first video frame for testing and the first sound signal for testing are time-synchronized with each other.

The processor may determine that the time synchronization performance is unsuitable when the time deviation exceeds a pre-designated reference range, and determine that the time synchronization performance is suitable when the time deviation is included in the pre-designated reference range.

An apparatus for evaluating performance of a DVRS may include a memory configured to store a video file, and a processor electrically connected to the memory, in which the processor extracts a sound signal from the video file, and evaluates suitability of volume of sound recorded by the DVRS generating the video file based on a digital sound pressure level of the extracted sound signal.

The video file may be transmitted by being generated by the DVRS recording sound while a simulation device outputs a sound signal for testing at each volume level pre-designated in each of pre-designated frequency bands.

Suitability of volume of the DVRS may include suitability of volume for each frequency band.

The processor may determine that the volume for each frequency band is suitable when a digital sound pressure level of the extracted sound signal is equal to or greater than a reference value, and determine that the volume for each frequency band is unsuitable when the digital sound pressure level of the extracted sound signal is less than the reference value.

The above-described examples may be implemented in the form of a recording medium storing instructions executable by a computer. Instructions may be stored in the form of program code, and when the instructions are executed by a processor, a program module may be created to perform the operations described herein. The recording medium may be implemented as a computer-readable recording medium.

Examples of the computer-readable medium include any type of recording medium in which instructions readable by the computer are stored. Examples thereof may include a read only memory (ROM), a random access memory (RAM), a magnetic tape, a magnetic disk, a flash memory, an optical data storage device, etc.

It will be apparent to those skilled in the art that various modifications and variations can be made in the present invention without departing from the spirit or scope of the invention. Thus, it is intended that the present disclosure covers the modifications and variations of the examples provided they come within the scope of the appended claims and their equivalents.

What is claimed is:

1. A method comprising:
    extracting, by a control device, a plurality of video frames from a video file generated by a driving video recording system mounted in a vehicle, wherein the driving video recording system obtains a plurality of images corresponding to a plurality of external views of the vehicle, wherein the video file is generated by the driving video recording system while a simulation device operably coupled to the driving video recording system outputs test video frames corresponding to a video portion of the video file and a test sound signal corresponding to a sound portion of the video file in real-time, wherein the simulation device generates the test video frames and the test sound signal based on pre-designated reference characteristics configured for synchronization testing of the driving video recording system, and wherein at least one first test video frame among the test video frames comprises a pre-designated reference color characteristic;
    identifying, by the control device and among the plurality of video frames, a time interval associated with at least one video frame that comprises a marker and identifying a first time point, of the time interval, corresponding to the at least one video frame, wherein the marker comprises a pre-designated color characteristic that comprises at least one of:
        a characteristic in which a color temperature satisfies a pre-designated color temperature value; or
        a characteristic in which a contrast ratio satisfies a pre-designated contrast ratio value;
    identifying, by the control device and from the video file, a sound signal corresponding to the at least one video frame to identify a second time point, of the time interval, associated with the sound signal corresponding to the at least one video frame, wherein the identifying the sound signal corresponding to the at least one video frame is based on a pre-designated sound characteristic, wherein the pre-designated sound characteristic comprises a characteristic in which amplitude of the sound signal corresponds to a maximum value, wherein the test sound signal is configured to vary across multiple pre-designated frequency bands to facilitate frequency-specific synchronization testing, and wherein the test sound signal comprises a first test sound signal comprising the pre-designated sound characteristic, and is time-synchronized with the test video frames; and
    outputting, by the control device and based on a time difference between the first time point and the second time point, synchronization performance value representing a time difference between the video portion and the sound portion or indicating whether the time difference between the video portion and the sound portion satisfies a predefined threshold.

2. The method according to claim 1, further comprising generating the synchronization performance value by at least one of:
   determining, based on the time difference between the first time point and the second time point exceeding a pre-designated reference range, that the synchronization performance is not satisfied; or
   determining, based on the time difference between the first time point and the second time point being in the pre-designated reference range, that the synchronization performance is satisfied.

3. A method comprising:
   extracting, by a control device, a sound signal from a video file generated by a driving video recording system, wherein the video file is generated by the driving video recording system while a simulation device outputs test video frames corresponding to a video portion of the video file and a test sound signal corresponding to a sound portion of the video file in real-time, wherein the simulation device operably coupled to the driving video recording system generates the test video frames and the test sound signal based on pre-designated reference characteristics configured for synchronization testing of the driving video recording system, and wherein at least one first test video frame among the test video frames comprises a pre-designated reference color characteristic;
   evaluating, by the control device, a performance of the driving video recording system by:
      identifying, by the control device and among a plurality of video frames of the video file, a time interval associated with at least one video frame that comprises a marker and identifying a first time point, of the time interval, corresponding to the at least one video frame, wherein the marker comprises a pre-designated color characteristic that comprises at least one of:
         a characteristic in which a color temperature satisfies a pre-designated color temperature value; or
         a characteristic in which a contrast ratio satisfies a pre-designated contrast ratio value;
      identifying, by the control device and from the video file, a first sound signal corresponding to the at least one video frame to identify a second time point, of the time interval, associated with the first sound signal corresponding to the at least one video frame, wherein the identifying the first sound signal corresponding to the at least one video frame is based on a pre-designated sound characteristic, wherein the test sound signal is generated by the simulation device in real-time to evaluate frequency-specific synchronization, and wherein the test sound signal comprises a first test sound signal comprising the pre-designated sound characteristic, and is time-synchronized with the test video frames; and
      evaluating, by the control device and based on a digital sound pressure level of the extracted sound signal, volume of sound recorded by the driving video recording system; and
   generating, based on the evaluating the performance of the driving video recording system, a performance result associated with the driving video recording system.

4. The method according to claim 3, wherein the video file is generated by the driving video recording system while the simulation device outputs a test sound signal at one or more volume levels pre-designated in one or more pre-designated frequency bands.

5. The method according to claim 3, wherein the evaluating the volume of sound recorded by the driving video recording system comprises evaluating whether volume of the driving video recording system is satisfied for one or more frequency bands.

6. The method according to claim 5, wherein the evaluating the volume of sound recorded by the driving video recording system comprises:
   determining, based on the digital sound pressure level of the extracted sound signal satisfying a reference value, that the volume for one or more frequency bands is satisfied; or
   determining, based on the digital sound pressure level of the extracted sound signal not satisfying the reference value, that the volume for the one or more frequency bands is not satisfied.

7. A vehicle comprising:
   a driving video recording system mounted in the vehicle and configured to obtain a plurality of images corresponding to a plurality of external views of the vehicle;
   a memory configured to store a video file generated by the driving video recording system; and
   a processor coupled to the memory, wherein the processor is configured to:
      extract a plurality of video frames from the video file, wherein the video file is generated by the driving video recording system while a simulation device operably coupled to the driving video recording system outputs test video frames corresponding to a video portion of the video file and a test sound signal corresponding to a sound portion of the video file in real-time, wherein the simulation device generates the test video frames and the test sound signal based on pre-designated reference characteristics configured for synchronization testing of the driving video recording system, and wherein at least one first test video frame among the test video frames comprises a pre-designated reference color characteristic;
      identify, among the plurality of video frames, a time interval associated with at least one video frame that comprises a marker, and identify a first time point, of the time interval, corresponding to the at least one video frame, wherein the marker comprises a pre-designated color characteristic that comprises at least one of:
         a characteristic in which a color temperature satisfies a pre-designated color temperature value; or
         a characteristic in which a contrast ratio satisfies a pre-designated contrast ratio value;
      identify, from the video file, a sound signal corresponding to the at least one video frame to identify a second time point, of the time interval, associated with the sound signal corresponding to the at least one video frame, wherein the identifying the sound signal corresponding to the at least one video frame is based on a pre-designated sound characteristic, wherein the pre-designated sound characteristic comprises a characteristic in which amplitude of the sound signal corresponds to a maximum value, wherein the test sound signal is configured to vary across multiple pre-designated frequency bands to facilitate frequency-specific synchronization testing, and wherein the test sound signal comprises a first test sound signal comprising the pre-designated sound characteristic, and is time-synchronized with the test video frames; and output, based on a time difference between the first time point and the second time point, a synchronization performance value representing a time difference between the video portion and the sound portion or indicating whether the time difference between the video portion and the sound portion satisfies a pre-defined threshold.

8. The vehicle according to claim 7, wherein the processor is configured to:

determine, based on the time difference between the first time point and the second time point exceeding a pre-designated reference range, that the synchronization performance is not satisfied; and determine, based on the time difference between the first time point and the second time point being in the pre-designated reference range, that the synchronization performance is satisfied.

9. The vehicle according to claim 7, further comprising: a communication interface configured to receive, from the driving video recording system, the video file.

10. The vehicle according to claim 7, further comprising: the simulation device, wherein the driving video recording system is configured to generate, based on test video frames and the test sound signal, the video file.

11. The vehicle according to claim 10, wherein at least one first test video frame of the test video frames comprises the marker.

12. The vehicle according to claim 7, wherein the driving video recording system is configured to generate the video file by associating the plurality of images with the test video frames corresponding to the video portion of the video file.

13. The vehicle according to claim 7, wherein the driving video recording system is configured to generate, during a pre-designated recording mode, the video file based on the plurality of images, the test video frames, and the test sound signal, and wherein the pre-designated recording mode comprises at least one of: a regular recording mode, or a recording mode activated when an impact to the vehicle occurs.

14. The method according to claim 1, further comprising:

obtaining, by the driving video recording system, a plurality of images corresponding to a plurality of external views of the vehicle; and generating, by the driving video recording system, the video file by associating the plurality of images with the test video frames corresponding to the video portion of the video file.

15. The method according to claim 14, wherein the generating the video file comprises: during a pre-designated recording mode, generating, by the driving video recording system, the video file based on the plurality of images, the test video frames, and the test sound signal, and wherein the pre-designated recording mode comprises at least one of: a regular recording mode, or a recording mode activated when an impact to the vehicle occurs.

* * * * *